Oct. 4, 1938.                J. W. TOYNE                2,132,248
                      ICE CUBE FREEZING DEVICE
                       Filed Aug. 16, 1937            2 Sheets-Sheet 1
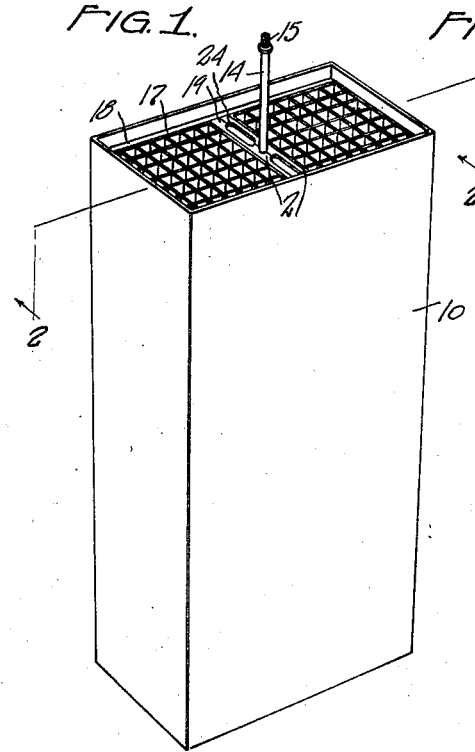
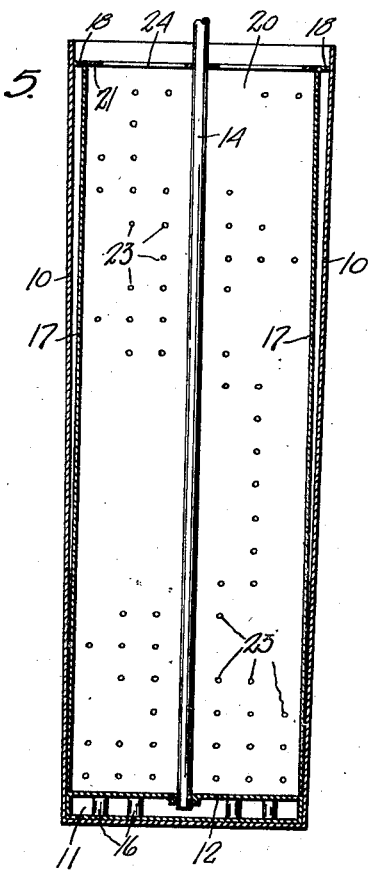
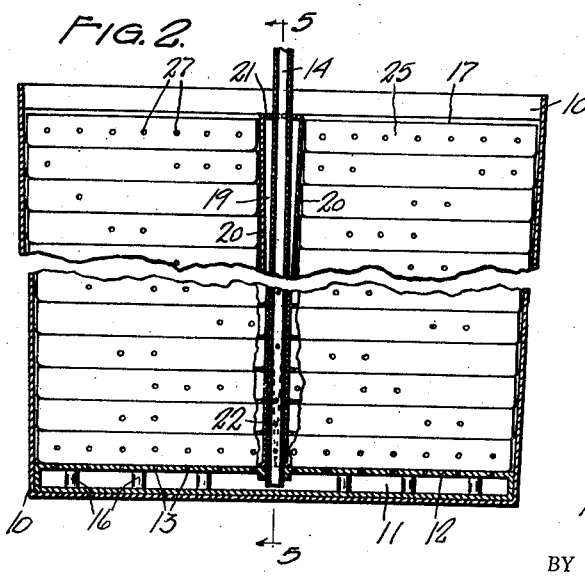
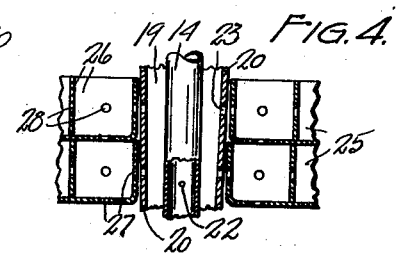
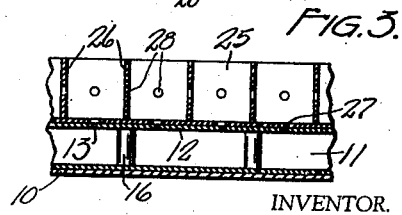
INVENTOR.
JOHN W. TOYNE
BY
ATTORNEYS.

Oct. 4, 1938.  J. W. TOYNE  2,132,248
ICE CUBE FREEZING DEVICE
Filed Aug. 16, 1937  2 Sheets-Sheet 2
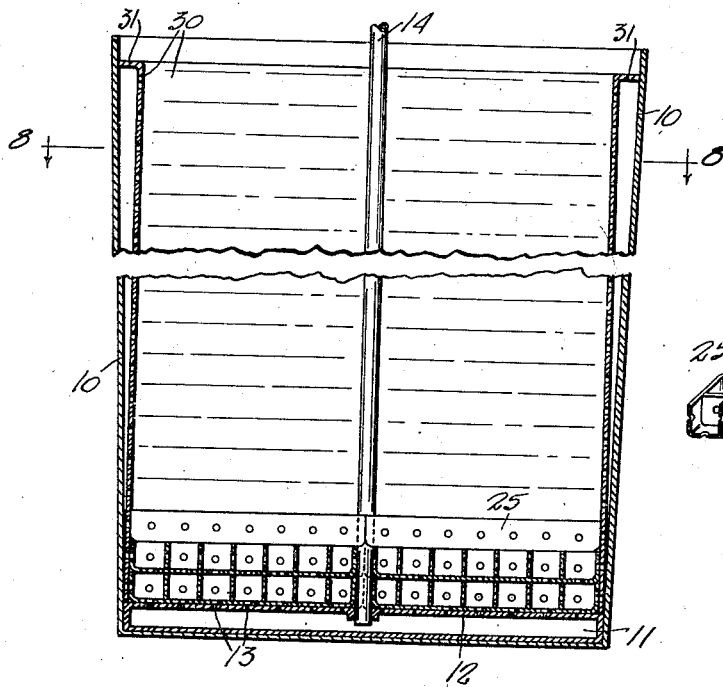
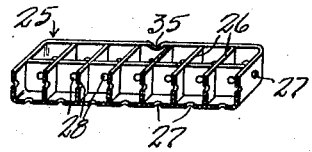
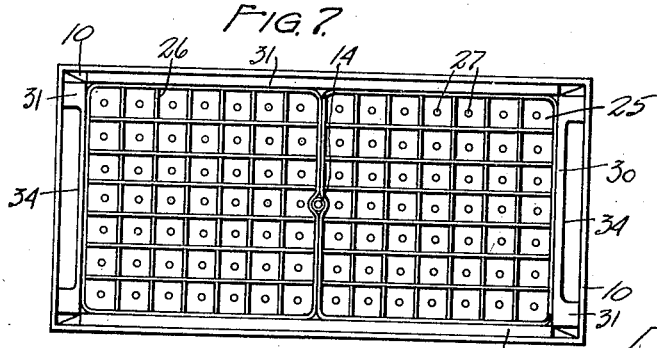
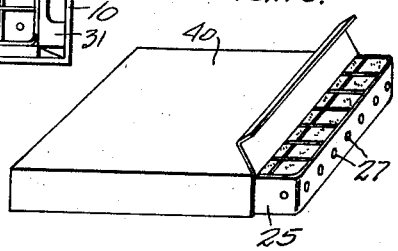
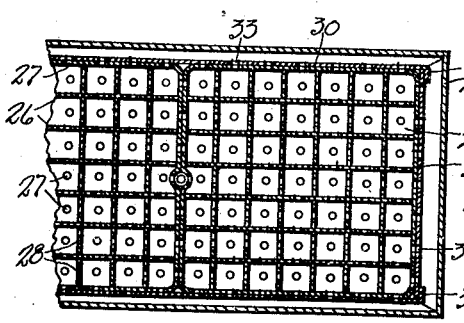
INVENTOR.
JOHN W. TOYNE
BY Oltsch & Knoblock
ATTORNEYS.

Patented Oct. 4, 1938

2,132,248

UNITED STATES PATENT OFFICE 2,132,248

ICE CUBE FREEZING DEVICE

John W. Toyne, South Bend, Ind.

Application August 16, 1937, Serial No. 159,238

8 Claims. (Cl. 62—108)

This invention relates to ice cube freezing devices, and particularly to a device by which small ice cubes or portions for table use may be manufactured on a commercial basis.

Commercial practice as almost universally followed in the ice industry at this time in relation to the manufacture of such ice cubes, comprises freezing ice in large cakes of approximately 300 pounds in weight, and then sawing such cakes into small units or cubes of a dimension from approximately one to one and one-half inches. This practice has many objectionable features, some of which are a loss of approximately 40% of the ice by weight during the sawing operation, a high rate of accident and dismemberment of operators of the sawing machine, and high cost of the sawing machinery and of operation thereof. Various attempts have heretofore been made to develop means by which the ice may be frozen in small unit form, but to the best of my knowledge such attempts have not been entirely successful from a commercial standpoint by reason of the high cost of the equipment, the necessity for use of specially designed freezing cans, failure to provide means by which the water may be aerated while being frozen as is necessary to produce a cake of clear, unclouded ice, and various other objectionable features.

It is, therefore, the primary object of this invention to provide a novel device of this character by which ice may be frozen in cakes or pieces of small dimension by the use of the freezing can now conventionally employed in commercial refrigeration.

A further object is to provide a device of the character with novel means for aerating each ice portion while it is being frozen to produce clear and unclouded ice.

A further object is to provide a device of this character constructed to permit ready release of the individual ice portions with minimum loss thereof.

A further object is to provide a device of this character whereby a number of individual ice portions may be frozen within a receptacle which serves as a package in which the ice portions may be sold.

A further object is to provide a device of this character wherein an air pressure chamber is mounted in an ice freezing can and supports superimposed apertured partitioned freezing trays, said chamber having air exhaust apertures registering with said tray apertures and of restricted size as compared to said tray apertures to permit passage of air into the trays without drainage of water from the trays into the air chamber.

A further object is to provide a device of this character wherein ice cubes may be frozen, and which eliminates the necessity of handling the individual cubes when frozen.

A further object is to provide a novel method for freezing a plurality of portions of clear unclouded ice in a common container.

Other objects will be apparent from the description, drawings and claims.

In the drawings:

Fig. 1 is a perspective view illustrating one embodiment of my invention employed in a conventional commercial ice freezing can.

Fig. 2 is a fragmentary vertical sectional view taken on line 2—2 of Fig. 1.

Fig. 3 is an enlarged fragmentary sectional view on line 2—2 of Fig. 1 illustrating the lowermost ice cube tray and its communication with the air chamber of the device.

Fig. 4 is an enlarged fragmentary sectional view on line 2—2 of Fig. 1 illustrating the arrangement of the air conduit, divider and trays.

Fig. 5 is a vertical sectional view of the device taken on line 5—5 of Fig. 2.

Fig. 6 is a longitudinal vertical sectional view of a modified form of the device.

Fig. 7 is a top plan view of the device illustrated in Fig. 6.

Fig. 8 is a horizontal sectional view taken on line 8—8 of Fig. 6.

Fig. 9 is a perspective view of an ice cube tray with parts shown in section.

Fig. 10 is a perspective view illustrating the manner in which groups of ice cubes may be packaged.

Referring to the drawings, the numeral 10 designates a conventional commercial ice freezing can. These cans 10 are generally somewhat tapered to accommodate expansion of freezing ice and to facilitate removal of ice therefrom. In one common form, these cans, for freezing a cake of ice weighing 300 pounds, are about 46 inches high, 10 inches wide and 20 inches long at their base, and 11 inches wide and 22 inches long at their open upper end. These cans are the freezing units usually employed in the commercial manufacture of ice and are adapted to be partially immersed in a brine tank, as is conventional.

Within the can 10 at the bottom thereof, I insert a comparatively shallow chamber 11 which fits snugly as illustrated in Fig. 2 but may be removable if desired. The top wall 12 of chamber 11 is provided with a plurality of series or rows of small apertures 13, said apertures preferably being about 3/32 inch in diameter. An air supply conduit 14 projects through chamber wall 12, and has a substantially sealed fit therewith but is removable therefrom. The upper end of conduit 14 is provided with a fitting 15 to afford simple and readily operable means for connecting with an air line, as by means of a flexible tube (not shown). Chamber 11 may be formed of any suitable material, as metal or rubber; and in the event rubber is employed, suitable reinforcing studs 16 may be molded between the top and bottom walls.

In the embodiment of the invention illustrated in Figs. 1 to 5, I provide liner plates 17 adjacent the opposed longitudinal side walls of can 10 and resting on chamber 11, said plates each being provided with an out-turned flange 18 at their upper ends of such width that when the edges of said flanges bear against the wall of the can at the top thereof, and the lower ends of plates 17 also bear against the wall of the can, the plates 17 will be substantially vertically positioned. Between these liner plates 17 at the center of the can is mounted a vertical divider 19 which rests upon wall 12 of chamber 11 and serves, with liner plates 17, to form a pair of complementary opposed compartments in the can, each of whose transverse dimensions is substantially uniform throughout its length. The divider preferably comprises opposed sheet metal walls 20 which are positioned parallel to the adjacent end walls of the can 10, whereby the divider is V-shaped in cross section. The walls 20 preferably abut at their lower ends, and are provided at their upper ends with horizontal abutting flanges 21. Conduit 14 extends centrally vertically through divider 19 and the opposed walls of the divider are preferably outwardly offset or cut away the centers of their lower ends for passage of the conduit therebetween. The conduit may have a plurality of small apertures 22 in the lower portion thereof communicating with the interior of the divider, said apertures preferably being about 3/32 inch in diameter. The divider walls 20 are preferably provided with horizontal rows or series of spaced apertures 23, preferably about 1/8 inch in diameter. The flange portion 21 of the divider plates are preferably recessed to provide large openings 24 therein.

Within each of the end compartments of the freezing can 10 defined by liner plates 17 and divider 19, I stack ice cube trays 25, best illustrated in Fig. 9, the lowermost tray resting upon top wall 12 of chamber 11, and the others each resting upon the one next below. These trays may be formed of any suitable material, such as sheet metal, sheet rubber, or paper treated with paraffin or other suitable waterproofing material. Each tray 25 is provided with a plurality of separators or partitioning members 26 in the nature of intersecting vertical rigid sheets or plates of a height substantially equal to the height of the tray and each extending between opposite side walls of the tray. These separators 26 divide the tray into cube compartments open at their upper end, as is conventional. The bottom and side walls of the trays 25 are each provided with a plurality of apertures 27 therein, there being one such aperture in each of the bottom and walls, for and substantially centrally of the adjacent cube compartments. Each of the partitions 26 is provided with a plurality of apertures 28 therein, one centrally of each cube-wall-defining portion thereof. The construction thus provides each cube compartment of the tray with an aperture centrally in the bottom thereof and centrally in each side wall thereof. These apertures 27 and 28 are each approximately 1/8 inch in diameter. The apertures 27 in the bottoms of the trays are arranged in the same relation as aperture 13 in air compartment top wall 12, so that apertures 27 of the bottom tray are concentric and register with apertures 13, it being seen that the bottom tray 25 in the stack is always positioned by divider 19 to insure such aperture registration when the trays are inserted and without necessity of additional means to insure registration. Likewise, the apertures 23 in the walls 21 of divider 19 are so arranged that they will register with the apertures 27 in the outer side walls of trays 25 when the latter are positioned in operative stacked relation. The trays, though stacked slightly out of alignment or register by virtue of the inclination of the receiving compartments thereof as best illustrated in Fig. 2, are nevertheless sufficiently aligned to permit communication between corresponding cube compartments of adjacent superimposed trays through the apertures 27 in the tray bottoms, as best illustrated in Fig. 4. The lowermost trays are preferably provided with inset side portions 35 in order to fit around conduit 14.

In the use of the device, the chamber 11 being operatively positioned in the can 10, the lower end of conduit 14 is first inserted through the opening therefor in the top wall 12 of the container; and liner plates 17 and divider plates 20 are then inserted in operative position within the can 10; followed by stacking of trays 25 within each can compartment formed by said liners and dividers and upon air chamber 11. Conduit 14 is then connected to a suitable air line (not shown) whereby air under pressure is supplied to the device at chamber 11 and apertures 22. After the supply of air has been initiated, can 10 is filled with water to the usual level according to its size, the water being preferably supplied through the openings 24 in flanges 21 of the divider plates, though it may also be poured directly into the top trays. The water will, of course, flow through the divider plate apertures 23 and tray apertures 27 registering therewith to fill all trays below the desired level in the can, and will seep from one tray to those below through tray bottom openings 27. The apertures 28 in tray partitions 25 will insure filling of all cube compartments of the trays. If desired in order to permit filling to the desired level only, the trays above that level may be omitted during the filling operation, to be positioned in the device thereafter. The pressure of the air supplied by conduit 14 is slightly greater than the pressure of the water upon chamber 11. This pressure difference is preferably just sufficient to prevent the water from passing through restricted chamber apertures 13 and pipe apertures 19 and at the same time permit a certain amount of air to bubble through the water, passing from one tray to another for exhaust at the open upper end of the can. In other words, the construction is such as to permit aeration of the water in each tray compartment throughout the can to insure clear and unclouded ice formation of each individual cube of the device. This air pressure also serves to reinforce the air chamber when the latter is formed of rubber.

The air is supplied to the device continuously during the freezing operation. Thus as the water freezes from the outside toward the center, aeration of the unfrozen portions likewise continues. It will be seen in this connection that, as the freezing action progresses inwardly with resultant progressive closing of the air chamber apertures 13 from the outside toward the center, the air can continue to exhaust through such apertures 13 as remain open, and thence pass from tray to tray through tray apertures 27 and 28 to all cube compartments thereof which are not sealed against passage of air by ice formation therein. Furthermore, by the provision of apertures 22 in conduit 14 at the lower portion thereof, aeration may continue even after the water in the bottom trays 25 is completely frozen to stop exhaust of air through chamber apertures 13. It will also be observed that as ice is formed, with resultant expansion, water remaining unfrozen is forced upwardly through tray apertures 27 and 28 to fill the trays which are above the water line when the can is first filled, thereby preventing damage to the device by reason of such expansion. Likewise, the stacked relation of the trays permits elevation thereof by the expansive force of the freezing ice in the event freezing occurs in any of the chambers from the walls thereof inwardly to form an ice sheath which prevents escape of excess water from the cube compartment.

When the water in the trays 25 of the device has been solidly frozen throughout, the conduit 14 is disconnected from the air line, and the can is removed from the brine tank to a tank of warm water or the like to break the frozen bond existing at the walls of the can 10. When this frozen bond is broken, the can contents can be removed from the can as a unit. This unit will consist of the trays 25, liner plates 17, divider 19, conduit 14 and ice slabs in the divider and outwardly of plates 17. If a frozen bond exists between the air chamber 11 and bottom cube trays 25, the air chamber will form a part of the unit; otherwise it will remain in the can and conduit 14 is disconnected therefrom. When the frozen unit has been removed from can 10, the liner plates can readily be stripped or pulled from the unit to expose and afford access to the stacked trays which can readily be separated and individually removed. The ice cubes can then be removed from the individual trays in any manner well understood in the art and depending upon the material of which the trays are formed. Thus the individual ice cubes are readily obtained from the device without necessity of handling them.

A modified construction of the device is illustrated in Figs. 6 to 8. In this construction, the same freezing can 10, apertured air chamber 11 and air conduit 14 as previously described are employed. Within the can 10 and adjacent each side wall thereof is disposed a liner plate 30 which is vertically positioned and rests upon the air chamber 11. Each plate 30 is provided with a horizontal outwardly directed flange 31 at its upper end, said flange being adapted to bear against the side wall of can 10. The plates 30 of at least one set are each provided with inwardly directed vertical flanges 32 at their side edges adapted to bear against the adjacent plates 30 to assist in holding said plates 30 in proper vertical relation. Each of plates 30 is provided with spaced horizontal series of spaced apertures 33. The flanges 31 of some of the plates may be apertured or cut away at 34.

Ice cube trays 25 having partitions 26 and both having apertures 27 and 28 respectively, as described above, are employed in this device, the same being stacked in pairs side by side within the vertical compartment defined by plates 30. For this purpose, the adjacent walls of the trays 25 are provided with complementary semi-circular inwardly directed off-sets 35, in order to fit around air conduit 14. Apertures 27 in the bottoms of the lowermost trays 25 are adapted to register with apertures 13 in the top wall 12 of air chamber 11 and apertures 28 in the outer side walls of each tray are adapted to register with apertures 33 in plates 30, in the same manner previously described when the trays are operatively stacked.

In the use of this construction, conduit 14 is connected with chamber 11, the plates 30 and trays 25 are operatively positioned in can 10, and said can is inserted in the brine or freezing tank. An air supply through conduit 14 is initiated, and the water to be frozen is then supplied to the device. The water is supplied to the uppermost trays 22 and through apertures 34 of plate flanges 31, and passes through the tray apertures 27, 28 and through apertures 33 in plate 30 to fill the can and the superimposed trays to the usual level in the freezing can. The water is prevented from entering apertures 13 of chamber 11 and conduit apertures 22 by the air pressure therein in the same manner heretofore described, and the air pressure is sufficient to permit the bubbling or aeration as above described. It will be noted, however, that in this construction slabs of ice of triangular section substantially the full height of can 10 encompass plates 30 and the trays at all four sides of the can. Thus when the water is frozen throughout the can, and the can is removed from the freezing tank and inserted in the container of warm water to release the bond between the ice and the can, only this outer ice slab is melted in this construction. The frozen assembly, when removed from can 10 after sufficient melting to break the frozen bond thus includes the ice cube trays 22, plates 30, conduit 14, and the encompassing ice sheath or slab, and possibly chamber 11 in this construction. The ice sheath is exposed and hence readily broken away, whereupon the plates 30 can be reached to be stripped or pulled away from the stacked ice cube trays to afford ready access to all of said trays for removal of the individual cubes.

While the largest portion of the ice cubes which are commercially frozen are sold in bulk, it is believed that there is a substantial potential market for packaged ice cubes. My device is readily adapted and suited for preparation of such packaged cubes by the use of cube trays 25 formed of paper, such as chip board, suitably treated, as with paraffin, to render the same waterproof. Thus paraffined chip board retains its waterproof qualities in excess of 48 hours, which is fully adequate for the freezing of ice cubes therein; and it may obviously be readily fabricated into an apertured ice cube tray of the construction above described. Furthermore, the device imposes no substantial stress upon the individual trays, particularly if the operation of filling the same with water is properly handled, as by filling through apertures 24 of the first described embodiment and apertures 34 of the other embodiment. It will, therefore, be seen that after the cubes have been frozen, the ice cube trays only need be separated, and the same can be inserted in a container 40 as illustrated in Fig. 10 preparatory to sale. The ice cubes will not form a frozen bond with the paraffined paper, so that the purchaser need only break the cubes of ice in the tray apertures 27, 28 in order to extract the individual cubes. This extraction is rendered simple by the breakable character of the chip board. In other words, the consumer can break away sufficient of the tray to easily obtain the number of cubes desired, while at the same time leaving the remainder of the tray as a container for remaining or unused cubes.

I claim:

1. A device of the character described comprising a container, an air chamber at the bottom of said container, and a plurality of open ended partitioned trays in said container supported by said chamber in superimposed relation, said trays being apertured whereby each section thereof is in communication with the adjacent sections thereof and of adjacent trays, said chamber having apertures therein registering with apertures in the lower tray and of a restricted size compared with said tray apertures, said air chamber being adapted to contain air under pressure greater than the pressure of water on said chamber at said registering apertures.

2. A device of the character described comprising a container, an air chamber at the bottom of said container having a plurality of spaced restricted apertures in its top, and a plurality of individual open ended members stacked on said chamber to divide the space in said container into a plurality of compartments, said members being apertured to open said compartments into communication vertically and horizontally, said last named apertures being larger than said chamber apertures and registering therewith in the bottom member, said air chamber being adapted to contain air under pressure greater than the pressure of water in said container.

3. An ice cube freezing device comprising a container open at one end and tapering toward its opposite end, means in said container for forming at least one compartment of uniform transverse dimension throughout its length, an air chamber in the bottom of said container, and a plurality of individual partitioned trays stacked in each compartment and supported on said chamber, the bottom and partitions of each tray being apertured, the top of said chamber having restricted apertures registering with the bottom apertures of the lowermost tray for exhaust of air into said compartment.

4. An ice cube freezing device comprising a container open at one end and tapering toward its opposite end, means removably mounted in said container for forming at least one compartment of substantially uniform transverse dimension throughout its length, an air chamber in the bottom of said container, and a plurality of partitioned trays having apertures in the bottom and partitions thereof and stacked in each compartment on said chamber, the top of said chamber having restricted air discharging apertures registering with the bottom apertures of said lowermost tray, said trays and means being removable from said container as a unit after ice cubes have been frozen therein to afford access to the individual trays.

5. An ice cube freezing device comprising a container open at one end, an apertured air chamber in the bottom of said container, a plurality of apertured partitioned trays stacked in said container and communicating with each other and with said air chamber, and means spaced from the walls of said container for positioning said trays, said positioning means having apertures registering with said tray apertures, said container being adapted to contain water to be frozen in portions of predetermined size and shape between said partitioning means and in thin slabs exteriorly of said partitioning means to facilitate removal of container contents therefrom as a unit of readily separable character.

6. An ice cube freezing device, comprising a downward tapered container open at its top, an air chamber fitting in the bottom of said container and having a plurality of spaced air discharge apertures in its top, vertical plates in said container in adjacent spaced relation to at least two walls of said container, a plurality of apertured partitioned trays stacked in said chamber between said plates with apertures of the lowermost tray at least as large as and registering with said chamber apertures, and an air line including a substantially upright conduit having a releasable connection with said chamber.

7. An ice cube freezing device, comprising a container open at its top, an apertured air chamber at the bottom of said container, a plurality of apertured partitioned trays stacked in said container on said chamber, said trays communicating with each other and with said chamber apertures, and a substantially upright air supply conduit adjacent said trays having a releasable connection with said chamber, said conduit being bonded to said trays by ice frozen in said container for removal from said container with said trays.

8. An ice cube freezing device, comprising a tapered container open at its large dimension end, removable guides in said container defining a chamber of substantially uniform cross section from end to end, a plurality of apertured ice cube trays stacked in said chamber, and means for circulating air in each tray through said apertures.

JOHN W. TOYNE.